Dec. 18, 1923.
L. C. WESCOAT
1,478,079
ELECTRICAL DISTRIBUTION SYSTEM
Filed Sept. 24, 1921
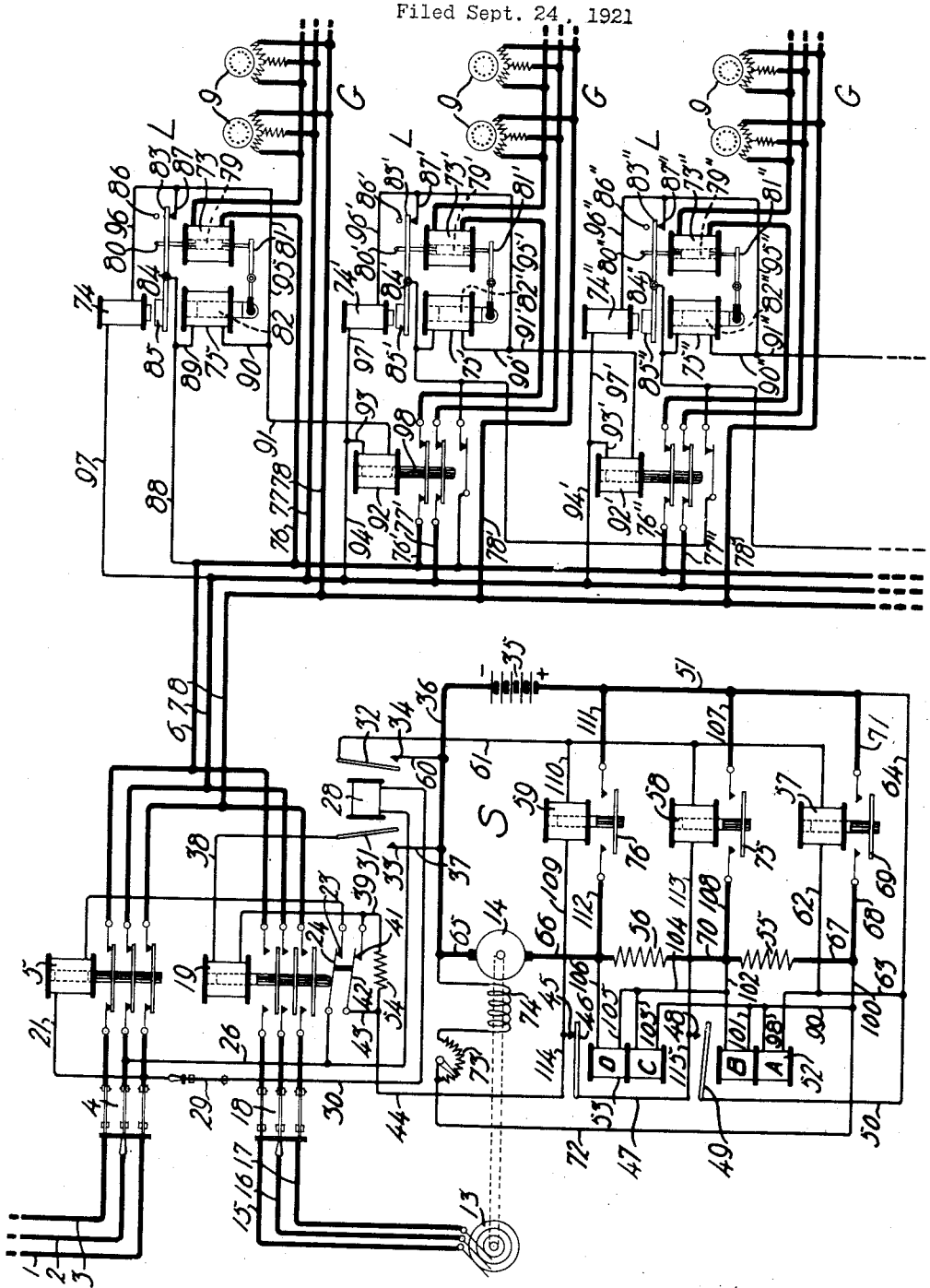
Inventor:
Lewis C. Wescoat,
by Hubert A. Pattison
Atty Patented Dec. 18, 1923.

1,478,079

UNITED STATES PATENT OFFICE.

LEWIS C. WESCOAT, OF CORONA, NEW YORK, ASSIGNOR TO WESTERN ELECTRIC COMPANY, INCORPORATED, OF NEW YORK, N. Y., A CORPORATION OF NEW YORK.

ELECTRICAL DISTRIBUTION SYSTEM.

Application filed September 24, 1921. Serial No. 502,984.

*To all whom it may concern:*

Be it known that I, LEWIS C. WESCOAT, a citizen of the United States, residing at Corona, in the county of Queens, State of New York, have invented certain new and useful Improvements in Electrical Distribution Systems, of which the following is a full, clear, concise, and exact description.

This invention relates to electrical distribution systems, and has particular reference to a system which is adapted for energization from either of two sources, one of the sources being a normal source, and the other an emergency source.

It is the primary object of the invention to provide a means for automatically starting a battery driven motor generator set which serves as an emergency source when the normal source of current fails, and to close a circuit from the emergency source to the distribution circuit when the emergency source is in full operation.

A further object is to provide a step-by-step load introducing arrangement. The translating devices in the load circuit are divided into groups and a combination of relays in each group which may be termed "current limit relays" serve to close the circuit through each succeeding group of translating devices when the translating devices in the preceding group attain a state of full operation. In this manner too great a strain on either current source is avoided.

More specifically the invention comprises an automatic two-source distribution circuit which functions on an emergency source whenever its normal current source becomes inoperative. The failure of the normal source serves to close, through the release of the armature of a deenergized relay, the circuit of a battery-driven motor, which actuates an emergency generator, the motor having two resistances in series with its armature that function as starting resistances when the motor circuit is first closed. As the motor picks up speed and the current through the circuit decreases, one of the two resistances is short-circuited through the agency of a motor accelerating relay, and as the current decreases further, the second resistance is short-circuited by a second motor accelerating relay, and the battery current is led directly through the motor armature. The emergency source being in full operation, a circuit-closing device is operated to connect it to the distribution circuit, and translating devices in this circuit are successively energized as the emergency source furnishes sufficient power to take care of them.

The system illustrated in the drawing, which shows one embodiment of the invention, is particularly designed to be used in cooperation with machine switching panels used in automatic telephone exchanges of the type disclosed in United States Patent No. 1,103,623 to J. N. Reynolds, dated July 14, 1914. In exchanges of this type motors are employed to actuate the machine switching panels and with the use of the system herein described, these motors are supplied from a commercial source, and, in case this source of current fails, are supplied with current from a motor generator set driven by current supplied from a storage battery located at the telephone exchange.

Although the present system is particularly adapted to operate in conjunction with an automatic telephone exchange of the type above referred to, it is to be understood that the invention is not limited to this application, but may be employed in conjunction with various types of translating devices where it is desired to operate them from either of two sources of current.

In the drawings, the elements of the system are shown in their normal positions in which current is being supplied the drive motors 9 which are divided into groups, generally designated by letters G, through current leads 1, 2 and 3, which constitute the normal current source.

In case the voltage impressed upon the leads 1, 2 and 3 fails, the drive motors 9 will either be brought to a dead stop or slackened considerably in speed according to their individual loads at the time of the current failure, and the group circuits of all but the first group will be interrupted.

Upon failure of the normal current source, a master control relay 28 is deenergized, which, through a group of relays generally designated by S, starts up a motor 14 which actuates a generator 13, said generator supplying current to the motors 9 through leads 15, 16 and 17, the motor generator 13, 14 constituting the emergency current source.

In order that the introduction of the load into the circuit may be more evenly distributed and so as not to interfere with the smooth operation of the emergency source, the drive motors are cut into the circuit in groups. Sets of relays designated generally by the letter L, serve to connect the groups of motors G to the emergency source, one group after another. The entire system is thus energized step-by-step and continues to operate on the emergency source, the total time taken for the transfer, assuming that there are ten group circuits, being approximately ten seconds—four seconds for starting the emergency set and approximately six seconds for the introduction of the load. Upon resumption of the normal current source, the reverse transferring operation takes place through the medium of relays L. In this case, however, the emergency generator is stopped and the normal current source is immediately available.

As previously stated, the elements of the system are shown in the positions that they occupy when the groups of motors 9 are being supplied by the normal current source connected to leads 1, 2 and 3. At this time the master control relay 28 is energized over a circuit which may be traced from conductor 1, triple pole knife switch 4, knife switch 29, conductor 30, winding of relay 28, conductor 26, switch 4 to conductor 2. While relay 28 is energized its two armatures 31 and 32 are attracted and are held away from their contacts 33 and 34, respectively, interrupting the emergency system.

Upon failure of the current impressed upon leads 1, 2 and 3, relay 28 will be deenergized, releasing its armatures. Armature 32 completes a circuit for a motor starting relay 57 of the group S, which may be traced from positive pole of battery 35, conductors 51, 64, 63, 62, winding of relay 57, conductor 61, armature 32 of relay 28, contact 34, conductors 60 and 36, to negative pole of battery 35. Relay 57 attracts its armature 69 and closes a circuit from battery 35 through starting resistances 55 and 56, and through a direct current motor armature 14, which may be traced from positive pole of battery 35, conductors 51, 71, armature 69 of relay 57, conductors 68, 67, starting resistance 55, conductor 70, starting resistance 56, conductor 66, armature of direct current motor 14, conductors 65, 36 to negative pole of battery. The motor 14 is of the shunt type, its field 74 being energized over a circuit extending from positive pole of battery 35, conductors 51, 71, armature 69 of relay 57, conductors 68, 100, 72, a manually adjustable rheostat 73, shunt winding 74, conductor 36, back to the negative pole of battery 35.

A motor accelerating relay 52 has two windings A and B. The winding A of relay 52 is in shunt of the terminals of armature 69 of relay 57 over a circuit from positive battery 35, conductors 51, 64, 63, winding A of relay 52, conductors 98, 99, 100, 67, resistance 55, conductor 70, resistance 56, conductor 66, motor 14, conductors 65, 36, to negative battery. Winding A will be short-circuited when relay 57 attracts its armature. Winding B of relay 52 is in shunt of starting resistance 55 over the following circuit: positive pole of battery 35, conductors 51, 71, armature 69 of relay 57, conductors 68, 100, 99, 101, winding B of relay 52, conductors 102, 70, starting resistance 56, conductor 66, motor 14, conductors 65, 36, to negative battery. Since the winding B is connected across the terminals of resistance 55, it will be energized by a current having a potential equal to the drop across resistance 55 which is sufficient during the first steps of the starting operation to energize relay 52, causing it to hold its armature 49 out of engagement with contact 48.

After the preliminary operation of relay 57, motor accelerating relay 52 functions. It is normally sufficiently energized, as stated above, through winding A, which is subject to a constant drain from the battery, to hold its armature 49 out of engagement with contact 48, while the distribution circuit is energized by the normal current source. Following the current failure and operation of relay 57 its armature 49 is closed against contact 48 as a result of the short-circuiting of winding A by the operation of relay 57, and a drop in the potential of terminal points of resistance 55 and consequently of winding B as the starting inertia of motor 14 is overcome and the current in the circuit is correspondingly decreased.

Contact closing relay 58 attracts its armature as a result of the release of armature 49, the latter operation closing a circuit which energizes relay 58 from positive pole of battery 35, conductors 51, 64, 50, armature 49, contact 48, conductor 113, winding of relay 58, conductor 61, armature 32 of relay 28, contact 34, conductors 60 and 36, to negative battery. Relay 58, in energizing, attracts its armature 75, which short-circuits the starting resistance 55 and energizes the emergency motor over a circuit which may be traced from positive pole of battery 35, conductors 51, 107, armature 75 of relay 58, conductors 108, 70, starting resistance 56, conductor 66, motor 14, conductors 65, 36 back to negative battery. Resistance 55, being short-circuited, more current will flow through the motor 14 and its speed accordingly increased.

A second motor accelerating relay 53 has a winding C which is connected in shunt of starting resistance 55 and is in parallel with winding B of relay 52. Its circuit may be traced from positive pole of battery 35, conductors 51, 71, armature 69 of relay 57, conductors 68, 100, 99, winding C of relay 53, conductors 103, 104, 102, 70, starting resistance 56, conductor 66, armature 14, conductors 65, 36 to negative pole of battery. Winding C is energized by a current having a potential equal to that of resistance 55 and of winding B of relay 52. A second winding D of relay 53 is connected across starting resistance 56 in a circuit which may be traced from the positive pole of battery 35, conductors 51, 71, armature 69 of relay 57, conductors 68, 67, starting resistance 55, conductors 102, 104, 105, winding D of relay 53, conductors 106, 66, motor 14, conductors 65, 36, to negative battery.

Upon the closing of the emergency drive motor circuit, motor accelerating relay 53 is energized through its windings C and D over the above circuits, and withdraws its armature 46 from engagement with contact 45 during the first steps in the starting operation. Subsequently, after a short circuiting of resistance 55, and of winding C, and a decrease in potential of winding D, due to an increase in speed of drive motor 14, it releases its armature and closes a circuit through the third contact-closing relay 59 over a circuit from positive pole of battery 35, conductors 51, 64, 50, armature 49, contact 48, (at the time of the operation of the contact of relay 53, relay 52 will be deenergized) conductor 47, armature 46, contact 45, conductor 109, winding of relay 59, conductors 110, 61, armature 32 of relay 28, contact 34, conductors 60, 36, back to negative battery. Relay 59, in energizing, draws up its armature 76 which closes a circuit from battery 35, directly through the motor 14. This is the operating circuit for the emergency motor and extends from positive pole of battery 35, conductor 111, armature 76 of relay 59, conductors 112, 66, armature of motor 14, conductors 65, 36 to negative pole of battery.

From the above it will be apparent that the motor accelerating relays 52 and 53, the contact-closing relays S and resistances controlled thereby constitute a rheostat automatically controlled.

When the emergency motor generator set attains a state of full operation, the armatures of the two motor accelerating relays 52 and 53 will have been released so that their contacts are closed and a circuit completed through their contacts and through triple contact relay 19, which may be traced from positive pole of battery 35, conductors 51, 64, 50, armature 49, contact 48, conductor 47, armature 46, contact 45, conductors 44, 43, contact spring 42, contact 41, conductor 39, winding of relay 19, conductor 38, armature 31, contact 33, conductors 37, 36, to negative battery. Contact springs 24 and 42 are withdrawn from contacts 23 and 41, respectively, by the operation of relay 19. Withdrawal of contact spring 24 from contact 23 causes a break in the circuit of relay 5, and prevents its energization, while the emergency set is in operation. The withdrawal of contact spring 42 from contact 41 puts a resistance 54 into the circuit of relay 19, which allows just enough current to flow through the coil of relay 19 to permit it to hold its armature in its closed position.

Relay 19, in energizing, completes a circuit from the emergency generator 13 through leads 15, 16, and 17, to the distribution leads 6, 7, and 8, to actuate the groups of translating devices G, which have become inoperative as a result of the failure of the normal current source.

The translating devices 9, which are shown as comprising induction motors, are added to the distribution circuit, group by group, by means of sets of relays L which are referred to in the specification and appended claims as "current limit" relays.

The first group of motors G is connected directly to the distribution circuits 6, 7 and 8 through branch leads 76, 77 and 78 so that they will be energized as soon as the relay 19 is energized. A relay 73 is energized in series in one of the leads of the first group, so as to be responsive to the current in said group, and is provided with a plunger 79 which has a pin 80 perpendicular thereto, and which rests upon but is not attached to a pivoted walking beam 81. Two other relays 74 and 75 are energized in parallel across the leads of the distribution circuits 6 and 7. Relay 75 has a plunger 82, which is pivotally connected to the walking beam 81 and which has sufficient weight to normally hold the plunger 79 of the relay 73 in its elevated position. A contact arm 83, which controls the circuits of the relays 74 and 75, is pivoted at 84, and swings between a contact 87 and a stop 86. A weight 85, attached to the contact arm 83, serves to normally hold the arm in engagement with stop 86, that is in its open position. A group contact closing relay 92 is operated as a result of the joint action of the relays 73, 74, and 75, and when operated, serves to close the energizing circuit of the second group of translating devices 9, through branch leads 76', 77', 78'.

The operation of the current limit relays takes place in the following manner: The energization of the distribution circuits 6, 7 and 8 causes a simultaneous energization of relay 73 in series in one of the branch leads of the first group circuit, and relay 75. The circuit of relay 75 may be traced from conductor 6, conductors 88, 89, winding of relay 75, conductors 90, 91, winding of relay 92, conductors 93, 94, to conductor 7. The current flowing through relay 92 at this time is not sufficient to cause it to attract its armature 98. Plungers 82 and 79 of relays 75 and 73, are held in their elevated positions, the latter plunger being separated at this time by a short space from the walking beam 81. As the translating devices 9 increase in speed, the current traversing the circuit will correspondingly decrease, and relay 73 will become weakened, allowing its plunger 79 to fall against the walking beam 81, causing pin 80 to engage contact arm 83 and to pull it into engagement with its corresponding contact 87. The operation of the contact arm 83 closes an energizing circuit for the relay 74 which may be traced from conductors 6, 88, contact arm 83, contact 87, conductor 96, relay 74, conductor 97, to conductor 7. Relay 74 attracts its armature to which the weight 85 is attached, and thus serves to lock contact arm 83 in engagement with contact 87. Simultaneously with this operation, relay 75 is short circuited, its plunger 82 is released and allowed to fall, elevating plunger 79 of relay 73 and moving the pin 80 out of engagement with contact arm 83, thus permitting free play of contact arm 83 for a subsequent failure of the current source and locating the plungers for subsequent starting operations. A second circuit is closed at this time through relay 92 which may be traced from conductors 6, 88, contact arm 83, contact 87, conductors 95, 91, winding of relay 92, conductors 93, 94, to opposite conductor 7. This energization of relay 92 is now sufficient to actuate the armature 98 and the circuit to the second group of translating devices is now closed through conductors 76', 77' and 78'.

Similar groups of relays are associated with each succeeding group of translating devices and operate in a manner similar to that just described with reference to the first group. In this way a step-by-step introduction of the load into the distribution circuit is accomplished, and too great a strain on either the normal or emergency generator is avoided.

When the system is energized from its emergency source 13 and its normal source again becomes effective, relay 28 is again energized, attracting its armatures 31 and 32, the former causing a deenergization of relay 19 and the latter stopping the emergency motor generator. Relay 19, in releasing its armature, closes through contact spring 24 an energizing circuit for relay 5, which in attracting its armature, connects the normal source to the distributing circuit, causing the successive operation of relays L to connect in the groups of translating devices G.

What is claimed is:

1. In a system of electrical distribution, a plurality of translating devices, a source of current serving to normally supply said translating devices with energy, an emergency source of current normally inoperative, means for putting said emergency source in operation when said first source fails, and further means serving to connect said translating devices when said emergency source is in full operation.

2. In a system of electrical distribution, a plurality of translating devices, a source of current serving to normally supply said translating devices with energy, an emergency source of current comprising a motor generator system, means for setting said motor generator system in operation when said first source fails, and further means serving to connect said translating devices when said motor generator is in full operation.

3. An electrical power system comprising a main source of energy and an emergency source, said emergency source being normally inactive, means for automatically setting said emergency source in operation when said normal source fails, a load for said system and means for gradually putting said load in circuit when the emergency source is in a state of full operation.

4. A system of electrical distribution comprising a normally active source, and a normally inactive source of electrical energy, means for automatically setting said inactive source in operation when said normal source fails, a load and means for gradually placing said load in the circuit of either of said sources.

5. In a system of electrical distribution, a distribution circuit, a normal source of current supply, and an emergency source both connected to said distribution circuit, means for rendering said emergency source operative when said normal source becomes inoperative, further means for rendering said emergency source inoperative when said normal source is operative, and means for automatically connecting the load to either of said sources as it becomes operative.

6. In an electrical power system, a source of supply normally serving to energize groups of translating devices, an emergency source, means for automatically setting said emergency source in operation when the normal source fails, means for automatically stopping said emergency source when said normal current supply is resumed, and means for introducing said translating devices into the distribution circuit step by step when either of said sources begins to energize its circuit.

7. A system of electrical distribution, a normal current source, an emergency source, a motor actuating said emergency source, a circuit for said motor, accelerating relays, a resistance, means whereby said relays will cut said resistance out of the motor circuit to automatically accelerate the motor, groups of translating devices, means for successively connecting groups of said translating devices to the circuit when said circuit becomes energized, said means comprising current limit relays in each group of translating devices whereby the circuit to each succeeding group is automatically closed when the devices in the previous group are under full operation.

8. In a system of electrical distribution, a normal current source and an emergency current source, groups of translating devices in the distribution end of said system, group circuits for each group of translating devices, relays responsive to the current in each group circuit, means actuated by said relays for closing the circuit of each successive group of devices when the devices in the previous group are in operation.

9. In a system of electrical distribution, a normal current source and an emergency current source, automatic means for starting said emergency source upon failure of said normal source, a series of translating devices energized in group circuits, and means for successively and automatically energizing said group circuits.

10. In a system of electrical distribution, a normal current source and an emergency current source, groups of translating devices in the distribution end of said system, group circuits for each of said groups, circuit closing devices for each circuit, and means for actuating the circuit closing devices of each circuit as the translating devices in the previous circuit are in operation.

11. In a system of electrical distribution, a normal current source and an emergency current source, automatic means for starting said emergency source upon failure of said normal source, a series of translating devices to be energized by said sources, and means for successively and automatically energizing said series of translating devices.

12. In a system of electrical distribution, a load divided into groups and energized in branch circuits, a normal current source, an emergency current source, actuating means for said emergency source, a storage battery for energizing said actuating means, a circuit for said actuating means, a resistance in said circuit, a relay responsive to a failure of the normal current source, serving to close said circuit, a relay responsive to the current flowing through said resistance serving to short-circuit said resistance to start said actuating means.

13. In a distribution circuit, groups of translating devices, group circuits for said devices, means responsive to the current flowing in one of said group circuits for closing the succeeding group circuit, a normal source of electrical energy serving to energize said distribution circuit, an emergency source of energy, actuating means for the same, means comprising combinations of relays whereby said actuating means may be automatically started upon failure of the normal current source.

14. In a distribution circuit, translating devices, group circuits for energizing said translating devices, means for automatically and successively closing said group circuits, a source of electrical energy normally energizing said circuits, an emergency source of energy normally inactive, a motor for actuating said emergency source, a battery and means whereby a circuit through said motor will be energized upon failure of said normal source.

15. In a system of electrical distribution, a supply system comprising a normal current source and an emergency current source, a load comprising a number of translating devices divided into groups, means for starting said load group by group, and means for setting said starting system in operation upon energization by the emergency current source.

16. In a system of electrical distribution, groups of translating devices, branch circuits for each group, means for automatically and successively energizing said branch circuits, a normal source of current for said system, an emergency source of current normally inactive, means for actuating said emergency source, further means responsive to the current from the normal current source for rendering said actuating means inoperative during the operation of said normal source, and means comprising combinations of relays for automatically starting said actuating means upon release of said current responsive means.

17. In a system of electrical distribution, a normal current source, an emergency current source, actuating means for said emergency source, means for automatically starting said actuating means when said normal source is inoperative and stopping said actuating means when said normal source is operative, groups of translating devices, branch circuits for said groups, alternately energized by said normal and emergency sources, means in each branch circuit responsive to the current in the preceding branch circuit whereby said circuit is connected to the energizing source when the current in the preceding circuit has decreased to a predetermined value.

18. In a system of electrical distribution, a normal current source, an emergency current source, means for actuating said emergency current source, means for automatically starting and stopping said actuating means according as said normal current source is operative or inoperative, a load circuit comprising groups of translating devices energized in branch circuits, means situated in each circuit responsive to the current flowing in said circuit for closing the following circuit when the current in said first circuit has reached a predetermined minimum value.

19. In a system of electrical distribution, a normal current source, an emergency current source, actuating means for said emergency source, means for starting and stopping said actuating means, a load circuit for said system comprising groups of translating devices energized in branch circuits, means in each of said circuits responsive to a diminishing current in said circuit for connecting the following circuit to the energizing source.

20. In a system of electrical distribution, groups of translating devices energized in branch circuits, a normal current source, an emergency current generator, actuating means for said emergency generator, an auxiliary current source, means responsive to a failure of said normal current source for connecting said auxiliary current source to said actuating means when said normal source fails, resistances in the circuit of said actuating means, and means responsive to the current flowing in each of said resistances serving to short circuit said resistances when the current in said resistances reaches a predetermined minimun value.

21. In a system of electrical distribution, groups of translating devices energized in branch circuits, a normal current source, an emergency current generator, actuating means for said emergency generator, an auxiliary current source, means responsive to a failure of said normal current source for connecting said auxiliary current source to said actuating means when said normal source fails, resistances in the circuit of said actuating means, and means cooperating with each of said resistances whereby said resistances are successively short circuited and the actuating means placed in full operation.

In witness whereof, I hereunto subscribe my name this 21st day of September A. D., 1921.

LEWIS C. WESCOAT.